Figure 1:
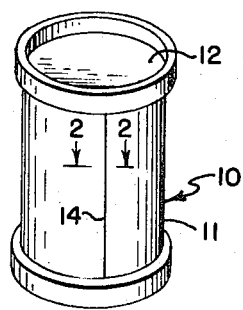

United States Patent

[11] 3,550,806

[72] Inventors: Dwight E. Peerman;
Leonard R. Vertnik, Minneapolis; Edgar R. Rogier, Minnetonka, Minn.
[21] Appl. No.: 552,980
[22] Filed: May 25, 1966
[45] Patented: Dec. 29, 1970
[73] Assignee: General Mills, Inc.
a corporation of Delaware

[54] METALLIC STRUCTURES
6 Claims, 3 Drawing Figs.

[52] U.S. Cl. .................................... 220/81,
156/332: 161/214, 161/227; 260/404.5
[51] Int. Cl. .................................... B65d 7/34,
C09j 5/00
[50] Field of Search............................ 161/36,
214, 227, Polyamide Digest; 156/217, 218, 331,
332; 220/75, 76, 81; 260/18N, 404.5, 23

[56] References Cited
UNITED STATES PATENTS

| | | | |
|---|---|---|---|
| 2,919,255 | 12/1959 | Hart............................... | 260/23 |
| 2,994,456 | 8/1961 | Peerman ....................... | 220/81 |
| 3,249,629 | 5/1966 | Rogier........................... | 260/404.5 |
| 3,357,935 | 12/1967 | Fuhmer et al................ | 260/18 |
| 3,396,180 | 8/1968 | Floyd et al..................... | 260/404.5 |
| 3,397,816 | 8/1968 | Ess et al......................... | 220/81 |
| 3,398,164 | 8/1968 | Rogier........................... | 260/404.5 |

Primary Examiner—Robert F. Burnett
Assistant Examiner—William A. Powell
Attorneys—Anthony A. Juettner, William C. Babcock and Patrick J. Span ABSTRACT: A metallic structure, particularly a metallic container or can, having lap seams in contrast to conventional hooked seams. The lap seam is bonded with polymeric fat acid polyamides wherein the polymeric fat acid has a dimeric fat acid content greater than 90 percent by weight and preferably greater than 95 percent by weight.

PATENTED DEC 29 1970 3,550,806

INVENTORS
DWIGHT E. PEERMAN
LEONARD R. VERTNIK
EDGAR R. ROGIER

BY *Patrick J. Span*

ATTORNEY

METALLIC STRUCTURES

This invention relates to metallic structures having lap seams and more particularly to metallic containers having such seams, in which the lap seam is bonded with a certain polyamide resin, more particularly a polymeric fat acid polyamide wherein said polymeric fat acid has a dimeric fat acid content greater than about 90 percent by weight and preferably greater than 95 percent by weight.

In the past, seams of metallic structure were bonded with metallic solders. Various resins have been proposed for cementing the seams of metallic structures such as metallic containers or cans as a substitute for the solder. For various reasons, such resinous adhesives or cements have not been successful. One deficiency has been the poor adhesion to many metal surfaces. In general, it was necessary therefore to utilize a hooked seam wherein the cement was largely a crack filler. An illustration of such a hooked seam can be found in FIG. 2 of U.S. Pat. No. 3,011,676. In such a seam, it was necessary that the cement have a very low viscosity in the molten stage so that the resinous cement could flow and completely fill the crack. This, however, had a disadvantage in that at sterilization temperatures the cement would again become molten and flow out of the seam. Accordingly, such resinous cements were unsuitable for structures such as cans where sterilization is required. Thermosetting resins which were proposed to solve this problem were not feasible, however, because curing times were too long particularly in the highly mechanized automatic devices used in making metallic containers which devices are mechanically timed and operate at high rates of speed.

It has now been discovered that polymeric fat acid polyamides prepared from polymeric fat acids having a dimeric fat acid content greater than 90 percent by weight, and preferably greater than 95 percent by weight can be employed as a cement for metallic structures having lap seams. With a lap seam, the requirement for low viscosity in the melt stage is eliminated as the adhesive can be applied by extrusion directly to the metal stock. Accordingly, high melting or softening point polyamides can be employed, the only requirement being that the polyamide melting or softening point be below the melting point of the metal to be adhered. Where the final metallic structure is required to be sterilized, as in containers for food products, such as beer, dog foods or human foods, the melting point of the resin must be higher than the sterilization temperature, which requirement is met by the products of this invention. The polyamides employed in this invention as the adhesive, possess high-temperature resistance (loss of a little strength as the melting point is approached), good adhesion to bare or coated metals and adhesion to "black iron," aluminum, or tin plate. The good adhesion to "black iron" or tinplate is important since steel is still less expensive than aluminum and is the material of choice for processed food cans. Adhesion to aluminum is important, however, since aluminum cannot conveniently be soldered. The resins are tough and resilient and the seams will not fail when the can is subjected to the ordinary handling in manufacture, sterilization, packing and shipping. Furthermore, the adhesive is resistant to the materials packed in the can, is not affected by the food products, and is not toxic.

Figure 2:
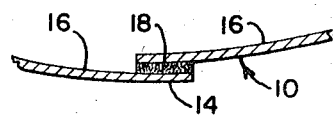
Figure 3:
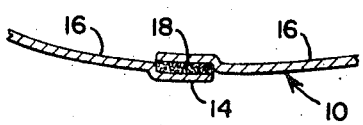

Referring to the drawing:

FIG. 1 shows a container 10 having a body 11 and an end closure 12 and side seam 4;

FIG. 2 shows the side seam 14 in detail which is composed of metal layers 16 with the adhesive 18 therebetween; and FIG. 3 is the same as FIG. 2, showing another modification of the seam in which the metallic layers 16 are offset or crimped to provide a more continuous circumferential surface.

In the specific drawing, the layers 16 represent the two ends of a circular can body. In metallic structures other than containers or cans, the layers 16 may be flat sheets, plates, castings, or the like of the same or dissimilar metals which are to be joined by a lap seam.

The metallic structures of this invention having lap seams bonded with the polymeric fat acids described may be bare metal or enameled or coated metals. Illustrative of the metals which may be bonded are steel, aluminum, tin plate, copper, bronze and the like. This invention has particular application in the metallic can field having lap seams. In the first step of fabrication of such a can, a strip of adhesive (preferably about one-fourth inch wide, about 0.003 inch thick, and as long as the joint) is applied to one edge of the can body blank. The circular can body is then formed by overlapping one-fourth inch and bonding the second edge of the can body blank to the adhesive containing edge. The adhesive can be applied by extrusion directly onto the edge of the metal blank or can be applied to a heated blank thereby melting the resin. After overlapping of the second can edge to the adhesive containing edge, the structure is first flash heated followed by quick cooling to below the melting point of the resin thus providing an almost instant bonded lap seam. Can ends may be applied in the standard double seam fashion or may also be applied in a lap seam fashion. With the width and thickness of adhesive strip described above, the total applied adhesive will be about 0.08 grams or less for a standard 12-ounce beverage can. Under good manufacturing practice, possible exposure of the adhesive in the side seam to the contents of the can will be limited to a hair line about 0.002 inches thickness running the height of the can. For a standard 12-ounce can, the total exposure of resin will then be about 0.01 square inch or less. If this exposure to the product cannot be tolerated, it may be desirable optionally to internally coat the can in the conventional manner with an inert coating such as a vinyl coating after the container is formed.

While application of the resin by extrusion technique is the preferred method, the resin adhesive may be applied by a hot melt technique, by use of a sheet or film, by solvent solution or by powder or granule form.

As indicated, the resin adhesive employed in the present invention for bonding lap seams is a polymeric fat acid polyamide prepared from polymeric fat acids having a dimeric fat acid content greater than 90 percent by weight and preferably greater than 95 percent by weight. These polyamide resins are prepared by conventional amidification processes which are well known. In general, in such amidification reaction the polyamide forming reactants are preferably heated to a temperature between 100 and 300° C. and the water of reaction is removed.

The polymeric fat acids are well known. A summary of the preparation thereof is found in U.S. Pat. No. 3,157,681. Commercially available polymeric fat acids so prepared from tall oil fatty acids generally have a composition as follows:

| | By weight percent |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimeric fat acids, and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric and trimeric fat acids. The term "fat acids" is intended to include saturated, ethylenically unsaturated and acetylenically unsaturated, naturally occurring and synthetic monocarboxylic aliphatic acids containing from 8 to 24 carbon atoms.

The saturated fat acids are generally polymerized by somewhat different techniques than those described in U.S. Pat. No. 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic, stearic acid, arachidic acid, behenic acid and lignoceric acid.

The ethylenically and acetylenically unsaturated fat acids which may be polymerized and their method of polymerization are described in the above mentioned U.S. Pat. No. 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, this analytical method was that employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

As earlier indicated, the polymeric fat acids employed to prepare the polyamides used in this invention have a dimeric fat acid content in excess of 90 percent by weight and preferably in excess of 95 percent by weight. Such polymeric fat acids are obtained by fractionation by suitable means such as high vacuum distillation or by solvent extraction techniques from polymeric fat acids having lower dimeric fat acid contents, such as the common commercially available products described earlier.

With polymeric fat acids having the dimeric fat acid content in excess of 90 percent, the polyamide products therefrom will desirably have number average molecular weights in excess of 10,000 and preferably in the range of 15,000—25,000.

The polyamides are prepared by reacting the polymeric fat acids with a diamine. The resins may also include other copolymerizing acid and amine components and the diamine employed may be a single diamine or a mixture of two different diamines. In addition, small amounts of monomeric, monocarboxylic acids may be present. With regard to any of the acid components, any of the equivalent amide-forming derivatives thereof may be employed, such as the alkyl and aryl esters, preferably alkyl esters having from 1 to 8 carbon atoms, the anhydrides or the chlorides.

The diamines employed may be aliphatic, cycloaliphatic or aromatic diprimary diamines, which may be ideally represented by the formula $$H_2N—R—NH_2$$

where R is an aliphatic, cycloaliphatic or aromatic radical preferably having from 2 to about 40 carbon atoms. While R is preferably a hydrocarbon radical, R may contain ether linkages such as in diamines prepared from diphenyl ether sometimes called diphenyl oxide. R may also be saturated or unsaturated, straight or branched chain. Representative of such diamines are the alkylene diamines having from 2 to 20 carbon atoms (preferably 2—6) such as ethylene diamine, 1,2-diamino propane, 1,3-diamino propane, 1,3-diamino butane, tetramethylene diamine, pentamethylene diamine, hexamethylene diamine, decamethylene diamine, and octadecamethylene diamine; metaxylylene diamine, paraxylylene diamine, cyclohexylene diamine, bis($\beta$-aminoethyl) benzene, cyclohexane-bis(methyl amine), diaminodicyclohexylmethane, methylene dianiline, bis(aminoethyl)diphenyl oxide, and dimeric fat diamine. The diamine may be employed alone or mixtures of two or more may be employed. The most preferred diamines are the alkylene diamines in which the alkylene group has from 4—6 carbon atoms and mixtures thereof with dimeric fat diamine (preferably having 36 carbon atoms).

The dimeric fat diamine, sometimes referred to as "dimer diamine," "dimeric fat amine," or "polymeric fat acid diamine" are the diamines prepared by amination of dimeric fat acids. Reference is made thereto in U.S. Pat. No. 3,010,782. As indicated therein, these are prepared by reacting polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —CH$_2$NH$_2$ groups. Further, this diamine is also described in Research and Development Products Bulletin, CDS 2—63 by General Mills, Inc., June 1, 1963, as "Dimer Diamine" illustrated by the formula
$H_2N—D—NH_2$ where D is a 36-carbon hydrocarbon radical of the dimeric fat acid.

The copolymerizing compounds commonly employed are aliphatic, cycloaliphatic or aromatic dicarboxylic acids or esters which may be defined ideally by the formulae:

$$R_1OOC—COOR_1 \text{ and } R_1OOC—R'—COOR_1$$

where R' is an aliphatic, cycloaliphatic or aromatic hydrocarbon radical preferably having from 1 to 20 carbon atoms (the most preferred being where R' is an alkylene radical having from 6—12 carbon atoms) and R$_1$ is hydrogen or an alkyl group (preferably having from 1 to 8 carbon atoms). Illustrative of such acids are oxalic, malonic, adipic, sebacic, suberic, pimelic, azelaic, succinic, glutaric, isophthalic, terephthalic phthalic acids, benzenediacetic acid, naphthalene dicarboxylic acids and 1,4- or 1,3-cyclohexane dicarboxylic acid.

Essentially molar equivalent amounts of carboxyl and amine groups are employed in preparing the polyamide. Where copolymerizing dicarboxylic acids are employed, it is preferred that the carboxyl groups from the polymeric fat acid should account for at least 50 equivalent percent of the total carboxyl groups employed.

The invention can best be illustrated by means of the following examples in which all percentages and parts are by weight unless otherwise indicated.

EXAMPLE 1

A polyamide was prepared in which the reactants and amounts were as follows:

| | lbs. |
|---|---|
| Sebacic acid | 16.3 |
| Hexamethylene diamine | 22.4 |
| Polymeric fat acids (polymerized tall oil fatty acids) | 60.0 |

The analysis of the polymeric fat acids is as follows in which the amount of monomer, intermediate, dimer and trimer were determined by gas-liquid chromatography (GLC).

| | |
|---|---|
| Percent monomer (M) | 0.9 |
| Percent intermediate (I) | 1.9 |
| Percent dimer (D) | 96.6 |
| Percent trimer (T) | 0.6 |
| Neutralization equiv. (N.E.) | 292 |
| Saponification equiv. (S.E.) | 285 |

The above reactants were charged into a reactor and heated to 250° C. over a period of about 4 hours. At this point vacuum was applied for about 2 hours at 250° C. and for about 1 hour at 270° C. Analysis of the resulting product was as follows:

| | |
|---|---|
| Acid (milliequivalents/kg.) | 34.9 |
| Amine (meq./kg.) | 18.3 |
| Inherent Viscosity | 0.95 |
| Ball and Ring Softening Point, ° C | 183 |
| Tensile Ultimate (p.s.i.) | 5,950 |
| Elongation (percent) | 445 |
| Yield Strength (p.s.i.) | 2,075 |

EXAMPLE 2

In the same manner as example 1, a polyamide was prepared from the same polymeric fat acids, the reactants and amounts being as follows:

| | |
|---|---|
| Acid (meq./kg.) | 29.0 |
| Amine (meq./kg.) | 18.5 |
| Ball & Ring Softening Point, ° C | >200 |
| Inherent Viscosity | 0.64 |
| Tensile Ultimate (p.s.i.) | 5,800 |
| Yield Strength (p.s.i.) | 4,230 |
| Elongation (percent) | 206 |

EXAMPLE 3

In the same manner as example 1, a polyamide was prepared from hexamethylene diamine and polymeric fat acids (polymerized tall oil fatty acids). The reactants, amounts and analysis of the resulting product were as follows:

| | |
|---|---|
| Hexamethylene diamine ___ lbs ___ | 30 |
| Polymeric fat acids ___ lbs ___ | 133 |
| Analysis (polymeric fat acids): | |
|    Percent M | 0.1 |
|    Percent I | 3.2 |
|    Percent D | 96.2 |
|    Percent T | 0.5 |
|    NE | 292 |
|    SE | 287 |
| Product Analysis: | |
|    Acid (meq./kg.) | 13.0 |
|    Amine (meq./kg.) | 8.5 |
|    Inherent Viscosity | 0.6 |
|    Ball and Ring Softening Point, ° C | 140 |
|    Yield Strength (p.s.i.) | 1,225 |
|    Tensile Ultimate (p.s.i.) | 4,805 |
|    Elongation (percent) | 515 |

EXAMPLE 4

In the same manner as example 1, a polyamide was prepared from hexamethylene diamine, suberic acid and polymeric fat acids (polymerized tall oil fatty acids). The reactants, amounts thereof, and analysis of the resulting product were as follows:

| | |
|---|---|
| Hexamethylene diamine ___ lbs ___ | 45.8 |
| Suberic Acid ___ lbs ___ | 28.5 |
| Polymeric fat acids ___ lbs ___ | 110 |
| Analysis: | |
|    Percent M | 1.7 |
|    Percent I | 2.1 |
|    Percent D | 95.0 |
|    Percent T | 1.2 |
|    NE | 294 |
|    SE | 287 |
| Product Analysis: | |
|    Acid (meq./kg.) | 78.9 |
|    Amine (meq./kg.) | 6.9 |
|    Inherent Viscosity | 0.57 |
|    Ball & Ring Softening Point (° C.) | 189 |
|    Tensile Ultimate (p.s.i.) | 5,170 |
|    Yield Strength (p.s.i.) | 2,135 |
|    Elongation (percent) | 415 |

EXAMPLE 5

In the same manner as example 1, a polyamide was prepared from hexamethylene diamine, sebacic acid and the polymeric fat acids of example 4. The reactant amounts and analysis of the resulting product were as follows:

| | |
|---|---|
| Polymeric fat acids ___ grams ___ | 2,650 |
| Sebacic Acid ___ do ___ | 2,170 |
| Hexamethylene diamine ___ do ___ | 1,840 |
| Product Analysis: | |
|    Acid (meq./kg.) | 5.5 |
|    Amine (meq./kg.) | 120.0 |
|    Inherent Viscosity | 0.75 |
|    Ball & Ring Softening Point (°/C.) | 203 |
|    Tensile Ultimate (p.s.i.) | 5,380 |
|    Yield Strength (p.s.i.) | 4,470 |
|    Elongation (percent) | 225 |

EXAMPLE 6

In the same manner as example 1, a polyamide was prepared from 4,4'-diamino-3,3'-dimethyldicyclohexylmethane and the polymeric fat acids of example 3. The reactant amounts and analysis of the resulting product were as follows:

| | |
|---|---|
| Polymeric fat acids ___ lbs ___ | 125 |
| 4,4'-diamino-3,3'-dimethyldicyclohexylmethane ___ lbs ___ | 52 |
| Product Analysis: | |
|    Acid (meq./kg.) | 15.9 |
|    Amine (meq./kg.) | 16.0 |
|    Inherent Viscosity | 0.6 |
|    Tensile Ultimate (p.s.i.) | 5,570 |
|    Yield Strength (p.s.i.) | 4,355 |
|    Elongation (percent) | 230 |

EXAMPLE 7

In the manner as example 1 and employing the polymeric fat acids of example 1, a polyamide was prepared from 1,4-bis($\beta$-aminoethyl)benzene. The reactant amounts and analysis of the resulting product were as follows:

| | |
|---|---|
| Polymeric fat acids ___ grams ___ | 3,656 |
| 1,4-bis($\beta$-aminoethyl)benzene ___ do ___ | 1,053 |
| Product Analysis: | |
|    Acid (meq./kg.) | 10.9 |
|    Amine (meq./kg.) | 23.6 |
|    Ball and Ring Softening Point (°/C.) | 170 |
|    Inherent Viscosity | 0.71 |
|    Tensile Strength (p.s.i.) | 4,910 |
|    Yield Strength (p.s.i.) | 2,645 |
|    Elongation (percent) | 440 |

EXAMPLE 8

In the same manner as example 1, employing the polymeric fat acids of example 1, a polyamide was prepared from hexamethylene diamine. The reactant amounts and analysis of the resulting product were as follows:

| | |
|---|---|
| Polymeric fat acids_____lbs__ | 75 |
| Hexamethylene diamine_____lbs__ | 15.94 |
| Product Analysis: | |
| Acid (meq./kg.)_____ | 35.5 |
| Amine (meq./kg.)_____ | 14.0 |
| Inherent Viscosity_____ | 0.69 |
| Ball and Ring Softening Point (°/C.)_____ | 152 |
| Tensile Strength (p.s.i.)_____ | 3,610 |
| Yield Strength (p.s.i.)_____ | 1,065 |
| Elongation (percent)_____ | 555 |

EXAMPLE 9

The tensile shear strength (p.s.i. at 24° C. was determined on can stock in accordance with ASTM D 1002—64. The results are as follows:

EXAMPLE 10

An evaluation was made on the polyamides for tensile shear and button tensile properties on cold rolled steel and 2024-T3 aluminum alloy. The tensile button samples were molded at various temperatures. The optimum temperature was 500° F. for steel and 550° F. for aluminum. For comparison purposes, tests were also run on Surlyn A and Zytel 69. The tensile shear specimens were prepared at approximately the polyamide extrusion temperatures for the aluminum test specimens and at 50° F. higher for the steel specimens. The metals were etched according to Procedure A (dichromate etch) for aluminum alloys and Procedure A4 (hydrochloric acid etch) for carbon steel as described in the June, 1961, proposals of the ASTM-D14, sub XI committee on Adhesives Testing. Table II below summarizes the results of these tests.

TABLE I

| | Optimum bonding temperature, °C. | Tensile shear strength (p.s.i.) | | | | | |
|---|---|---|---|---|---|---|---|
| | | 5086 Aluminum stock (0.017″) | | 5052-H19 Aluminum stock (0.008″) | | Tinplate stock (0.007″) | |
| | | Coated | Uncoated | Coated | Uncoated | Coated | Uncoated |
| Polyamide: | | | | | | | |
| Ex. 1_____ | 230 | 2,848 | 2,184 | 1,320 MF | 2,219 MF | 2,592 | 2,435 |
| Ex. 4_____ | 240 | 2,388 | 2,223 | 1,323 MF | 2,280 MF | 2,472 | 2,176 |
| Ex. 5_____ | 235 | 2,852 | 1,168 | 1,374 MF | 1,115 | 2,872 | 2,224 |
| Ex. 6_____ | 230 | 2,325 | 1,665 | 1,417 MF | 1,367 MF | 2,628½ MF | 1,786 |
| Ex. 7_____ | 240 | 2,595 | 1,955 | 1,333 MF | 1,462 MF | 2,718 | 2,250 |
| Ex. 8_____ | 230 | 2,172 | 1,884 | 1,352½ MF | 1,241 | 1,994 | 1,144 |

NOTE: All number values are the average of 5 individual test values. MF indicates failure in all 5 metal specimens rather than bond failure, or a fractional MF indicates number of specimens out of 5 which failed in the metal, not in the bond.

TABLE II

| Product of Example | Test temp., °F. | Tensile shear*, p.s.i. | | | | Button** bonding temp., °F. | Button tensile, p.s.i. | | | |
|---|---|---|---|---|---|---|---|---|---|---|
| | | Steel | | Aluminum | | | Steel*** | | Aluminum | |
| | | Avg. of 5 | Avg. of 3 | Avg. of 5 | Avg. of 3 | | Avg. of 3 | Avg. of 2 | Avg. of 3 | Avg. of 2 |
| 1—6 mil film_____ | 75 | 1,987 | 2,075 | 2,562 | 2,612 | 500 | 2,667 | 2,938 | 1,783 | 1,825 |
| | 75 | | | | | 550 | 2,533 | 2,700 | 2,033 | 2,050 |
| | 170 | 498 | 574 | 935 | 1,003 | 500 | 1,328 | 1,363 | | |
| | 170 | | | | | 550 | | | 1,228 | 1,248 |
| 2—4 mil film_____ | 75 | 1,758 | 1,929 | 1,772 | 2,024 | 500 | 2,758 | 2,975 | 1,817 | 2,038 |
| | 75 | | | | | 550 | 2,500 | 2,725 | 2,447 | 2,535 |
| | 170 | 675 | 727 | 1,015 | 1,176 | 500 | 1,945 | 2,080 | | |
| | 170 | | | | | 550 | | | 1,745 | 1,798 |
| 3—4 mil film_____ | 75 | 1,217 | 1,278 | 1,679 | 1,738 | 500 | 2,542 | 2,688 | 1,725 | 1,825 |
| | 75 | | | | | 550 | 2,503 | 2,530 | 2,073 | 2,185 |
| | 170 | 17 | 22 | 29 | 33 | 500 | 305 | 310 | | |
| | 170 | | | | | 550 | | | 328 | 348 |
| 4—5 mil film_____ | 75 | 1,977 | 2,047 | 2,620 | 2,666 | 500 | 2,642 | 3,163 | 1,758 | 1,838 |
| | 75 | | | | | 550 | 2,300 | 2,325 | | 2,225 |
| | 75 | | | | | 600 | | | | 1,707 |
| | 170 | 511 | 572 | 1,009 | 1,031 | 500 | 1,133 | 1,160 | | |
| | 170 | | | | | 550 | | | 1,042 | 1,100 |
| Surlyn A—4-5 mil film____ | 75 | 1,090 | 1,154 | 1,778 | 1,859 | 500 | 3,100 | 3,275 | (¹) | (¹) |
| | 75 | | | | | 550 | 2,833 | 2,925 | 2,850 | 2,962 |
| | 170 | 260 | 282 | 657 | 716 | 500 | 677 | 835 | | |
| | 170 | | | | | 550 | | | 852 | 862 |
| Zytel 69****—7 mil film___ | 75 | (²) | (²) | 374 | 390 | 500 | (³) | (³) | (³) | (³) |
| | 75 | | | | | 550 | 750 | 835 | 1,400 | 1,525 |
| | 75 | | | | | 600 | (⁴) | | 3,483 | 3,775 |
| | 170 | (²) | (²) | | | 500 | 310 | 325 | | |
| | 170 | | | 204 | 234 | 550 | 525 | 550 | 510 | 540 |
| | 170 | | | | | 600 | | | | 1,145 |

¹ Poor Bond.
² Bond shows poor adhesion, too weak to test.
³ No Bond.
⁴ Not Run.
*Adhesive thickness, 2-3 mils.
**For GMI polymers, 450° F. gave very low values, less than 1,000 p.s.i., poor bonds.
***Very severe oxidation occurs at 550° F. and higher.
****Polymer forms poor adhesive bonds, particularly in tensile shear.

EXAMPLE 11

Using a resin of the same reactants as in example 1, the effect of overlap dimensions was studied. On 0.064 inch 2024-T3 aluminum, the results were as follows:

| Overlap dimension (in.): | Tensile shear, p.s.i.: |
|---|---|
| 1/4 | 2,892 |
| 1/2 | 1,775 |
| 3/4 | 1,853 |
| 1 | 1,752 |

To compare specimens overlapped one-eighth inch, it was necessary to use thin can makers uncoated tinplate. With this substrate, the 1/8-inch specimens gave a tensile shear value of 2,702 p.s.i. as compared to 2,435 p.s.i. obtained with a 1/4-inch overlapped specimen. Tinplate specimens overlapped one-half, three-fourths, and one inch were also tested. These all failed in the metal rather than in the adhesive bond.

EXAMPLE 12

The effect of polymer viscosity on tensile strength of the same polyamide of example 11 was studied. The relative viscosities were observed by Brabender Readings at 200° C. The bond temperature was 230° C. the bond thickness was 5 mils, and the crosshead speed was 0.2 inch/min. The specimens were 5086 Aluminum 0.017 inch thick. The overlap dimension was one-fourth inch. The results are as follows:

| Brabender Reading (200° C.) | Tensile shear strength on Aluminum | |
|---|---|---|
| | Coated | Uncoated |
| 510 (High viscosity range) | 2,220 | 1,696 |
| 515 (High viscosity range) | 2,020 | 819 |
| 342 (Medium viscosity range) | 2,763 | 1,576 |
| 365 (Medium viscosity range) | 2,637 | 1,830 |
| 105 (Low viscosity range) | 1,892 | 1,357 |
| 155 (Low viscocity range) | 2,244 | 1,160 |

This indicates that the medium viscosity range is desirable for adhesive use.

EXAMPLE 13

The peel strengths of various polymers were determined including for comparison two commercially available nylon resins. The results are as indicated.

| Polymer | Bond temperature, °C. | Peel strength mean, lbs./in. |
|---|---|---|
| Nylon 11 | 245 | 5.0 |
| Nylon 12 | 196 | 3.8 |
| A | 240 | 5.9 |
| B | 230 | 10.2 |
| C | 235 | 37.3 |
| D | 230 | 7.6 |
| E | 240 | 19.8 |
| F | 201 | 12.8 |
| G | 205 | 8.5 |

A. Polymer of hydrogenated and distilled polymerized tall oil fatty acids, suberic acid and hexamethylene diamine (75/25)

B. Polymer of hydrogenated and distilled polymerized tall oil fatty acids, sebacic acid and hexamethylene diamine (75/25)

C. Polymer of hydrogenated and distilled polymerized tall oil fatty acids, sebacic acid and hexamethylene diamine (50/50) 50/50

D. Polymer of hydrogenated and distilled polymerized tall oil fatty acids and 4,4'-diamino-3,3'-dimethyldicyclohexylmethane E. Polymer of hydrogenated distilled polymerized tall oil fatty acids and 1,4-bis($\beta$-aminoethyl)-benzene F. Polymer of hydrogenated and distilled polymerized tall oil fatty acids and 4,4'-diaminodicyclohexylmethane G. Polymer of hydrogenated and distilled polymerized tall oil fatty acids and 4,4'-bis($\beta$-aminoethyl)-diphenyl oxide.

In the foregoing polymers the molar equivalent amounts have been indicated for the copolymer where copolymerizing acids were employed in the form of a ratio showing the molar ratio of each type of polymer, the first FIG. being the amount of polymer of the polymerized tall oil fatty acids.

While various modifications of the invention have been described, it is to be understood that other variations are possible without departing from the spirit of the invention as defined in the following claims.

We claim:

1. A metallic structure having lap seams, said lap seams being bonded by an adhesive consisting essentially of a polymeric fat acid polyamide wherein said polymeric fat acid has a dimeric fat acid content greater than about 90 percent by weight and is a polymerized monocarboxylic fatty acid, said monocarboxylic fatty acid having from 8 to 24 carbon atoms, said polyamide consisting of the amidification product of substantially molar equivalent amounts of amine and carboxyl groups selected from the groups consisting of:

A. said polymeric fat acid and a diamine selected from the group consisting of:
   a. hexamethylene diamine;
   b. xylylenediamine;
   c. cyclohexylene diamine;
   d. bis($\beta$-aminoethyl) benzene;
   e. cyclohexanebis(methylamine);
   f. diaminodicyclohexylmethane;
   g. methylene dianiline;
   h. bis($\beta$-aminoethyl)diphenyloxide;
   i. the diamine of polymerized monocarboxylic fatty acids, said monocarboxylic acids having from 8 to 24 carbon atoms; and B. copolymers thereof with up to 50 equivalent percent of a dicarboxylic acid of the formula
   where R' is an alkylene radical having from 6 to 12 carbon atoms.

2. A metallic structure as defined in claim 1 wherein said polymeric fat acid has a dimeric fat acid content greater than 95 percent by weight.

3. A metallic structure as defined in claim 1 wherein said metallic structure is a metallic container.

4. A metallic structure as defined in claim 1 wherein said polymeric fat acid is polymerized tall oil fatty acids.

5. A metallic structure as defined in claim 4 in which said diamine is hexamethylene diamine and said dicarboxylic acid is sebacic acid.

6. A metallic structure as defined in claim 4 in which said diamine is hexamethylene diamine and said dicarboxylic acid is suberic acid.

PO-1050
(5/69)

UNITED STATES PATENT OFFICE
CERTIFICATE OF CORRECTION

Patent No. 3,550,806     Dated March 12, 1971

Inventor(s) Dwight E. Peerman, Leonard R. Vertnik & Edgar R. Rog

It is certified that error appears in the above-identified patent and that said Letters Patent are hereby corrected as shown below:

```
Col. 1, line 64, the numeral "4" should read  --14--.
Col. 4, line 43, "the" should read --a--.
Col. 5, line 31, after "follows:" insert
    --Polymeric fat acids                                5000 grai
     4,4'-diamino-3,3'-dimethyldicyclohexylmethane       2095 grai
     The analysis of the resulting product was as follows:--
Col. 6, line 57, after "the" insert --same--.
Col. 7, Table I, under column entitled "5052-H19...Uncoated"
        lines 1 and 2, the numeral "2,219MF" should read
        --1,219 MF-- and the numeral "2,280 MF" should read
        --1,280 MF--.
        Table II, under column entitled "Button tensile...St
        Avg. of 2," the fifth line from the bottom, the nume
        "835" should read  --825--.
Col. 10, line 6, the second "50/50" should be deleted.
         line 49, insert the formula   HOOC-R'-COOH
```

Signed and sealed this 29th day of June 1971.

(SEAL)
Attest:

EDWARD M. FLETCHER, JR.              WILLIAM E. SCHUYI
Attesting Officer                    Commissioner of F